(12) United States Patent
Richter et al.

(10) Patent No.: US 7,464,987 B2
(45) Date of Patent: Dec. 16, 2008

(54) WATER MANAGEMENT SYSTEM FOR A RETRACTABLE HARD TOP

(75) Inventors: Wolfgang Richter, Commerce Township, MI (US); Scott Yaroch, Howell, MI (US)

(73) Assignee: Wilhelm Karmann GmbH, Osnabruck (DE)

( * ) Notice: Subject to any disclaimer, the term of this patent is extended or adjusted under 35 U.S.C. 154(b) by 410 days.

(21) Appl. No.: 11/304,246

(22) Filed: Dec. 15, 2005

(65) Prior Publication Data

US 2006/0125292 A1 Jun. 15, 2006

Related U.S. Application Data

(60) Provisional application No. 60/636,400, filed on Dec. 15, 2004.

(51) Int. Cl.
*B60J 10/10* (2006.01)
(52) U.S. Cl. ..................................................... 296/213
(58) Field of Classification Search ................. 296/213, 296/210, 107.01, 107.04
See application file for complete search history.

(56) References Cited

U.S. PATENT DOCUMENTS

| | | | |
|---|---|---|---|
| 1,415,794 A | 5/1922 | Charbonneau | |
| 1,477,752 A | 12/1923 | Galamb | |
| 1,884,441 A | 10/1932 | Welch | |
| 2,319,723 A | 5/1943 | Crowe | |
| 2,544,580 A | 3/1951 | Blanchet | |
| 2,572,592 A | 10/1951 | Brandt et al. | |
| 2,649,330 A | 8/1953 | Schamel et al. | |
| 2,686,691 A | 8/1954 | Burrell | |
| 2,707,129 A | 4/1955 | Orr | |
| 2,714,525 A | 8/1955 | Kessler | |
| 2,752,192 A | 6/1956 | Doty | |
| 2,937,047 A | 5/1960 | Hezler, Jr. et al. | |
| 3,096,117 A | 7/1963 | Hallenbeck | |
| 3,143,373 A | 8/1964 | Fordyce | |
| 3,550,950 A | 12/1970 | Pollock | |
| 3,630,568 A | 12/1971 | Podwys | |
| 3,653,711 A | 4/1972 | De Claire et al. | |
| 3,892,439 A | 7/1975 | Gotz et al. | |
| 4,475,766 A * | 10/1984 | McKee | 296/213 |
| 4,494,790 A | 1/1985 | Omura et al. | |
| 4,582,358 A * | 4/1986 | Draper | 296/213 |
| 4,729,593 A | 3/1988 | Nisiguchi et al. | |
| 5,009,464 A | 4/1991 | Hasegawa et al. | |
| 5,022,705 A * | 6/1991 | Takahashi | 296/213 |
| 5,374,099 A * | 12/1994 | Huyer | 296/216.04 |
| 5,509,712 A | 4/1996 | Rausch et al. | |

(Continued)

FOREIGN PATENT DOCUMENTS

DE 40 17 196 5/1991

(Continued)

*Primary Examiner*—H Gutman
(74) *Attorney, Agent, or Firm*—Gifford, Krass, Sprinkle, Anderson & Citkowski, P.C.

(57) ABSTRACT

A water management system for directing fluid away from a gap defined between adjacent panels of a folding hardtop of a vehicle. The water management system includes first and second seals and a tube. The seals are disposed along respective gaps between adjacent panels. Each seal has a trough for collecting fluid entering the gap. The tube is in fluid communication with the troughs of both seals and directs the fluid to an external location of the vehicle.

20 Claims, 6 Drawing Sheets

U.S. PATENT DOCUMENTS

| | | | |
|---|---|---|---|
| 5,527,081 | A | 6/1996 | Rausch et al. |
| 5,961,174 | A | 10/1999 | Gold |
| 5,961,177 | A * | 10/1999 | Caye et al. .................. 296/213 |
| 6,053,568 | A * | 4/2000 | Jambor ....................... 296/213 |
| 6,145,909 | A | 11/2000 | Staley et al. |
| 6,270,154 | B1 | 8/2001 | Farber et al. |
| 6,332,645 | B1 * | 12/2001 | Schwarz ................ 296/216.09 |
| 6,419,308 | B1 | 7/2002 | Corder et al. |
| 6,443,519 | B1 * | 9/2002 | Betzl .......................... 296/213 |
| 6,464,291 | B2 | 10/2002 | Hynds et al. |
| 6,467,837 | B1 * | 10/2002 | Tolinski ................. 296/216.07 |
| 6,561,565 | B2 | 5/2003 | Langguth et al. |
| 6,641,202 | B2 | 11/2003 | Graf et al. |
| 6,648,405 | B2 | 11/2003 | Bunsmann et al. |
| 6,837,538 | B2 * | 1/2005 | Itoh et al. .............. 296/216.06 |
| 6,851,744 | B2 * | 2/2005 | Niebuhr et al. .............. 296/213 |
| 2004/0104604 | A1 | 6/2004 | Doncov et al. |

FOREIGN PATENT DOCUMENTS

| | | |
|---|---|---|
| DE | 4039444 A1 | 6/1992 |
| DE | 43 02 547 | 3/1994 |
| DE | 19502325 | 8/1996 |
| JP | 4-257734 | 9/1992 |
| JP | 5 77645 | 3/1993 |
| JP | 5 139162 | 6/1993 |
| JP | 63-43822 | 12/1994 |

* cited by examiner

US 7,464,987 B2

WATER MANAGEMENT SYSTEM FOR A RETRACTABLE HARD TOP

REFERENCE TO RELATED APPLICATION

This application claims priority to U.S. Provisional Patent Application Ser. No. 60/636,400, filed on Dec. 15, 2004, the entire content of which is incorporated herein by reference.

FIELD OF THE INVENTION

The invention relates to retractable tops for automotive vehicles. More particularly, the invention relates to a water management system for collecting and guiding liquid away from a retractable top.

BACKGROUND OF THE INVENTION

A retractable top for an automotive vehicle typically includes at least two panels hinged for movement between an extended position disposed end to end to cover a passenger compartment and a retracted or stowed position disposed in a compartment behind the passenger compartment. The panels typically abut to define a gap or seam in which a water management structure in the form of a seal is positioned to prevent liquid from leaking between the panels and into the passenger compartment. It remains desirable to provide an improved water management system for directing water between the seam and an exterior area of the vehicle.

SUMMARY OF THE INVENTION

According to one aspect of the invention, a water management system for a folding hardtop of a vehicle is provided, where the hardtop has at least two panels movable to an extended position covering the passenger compartment, and where the panels are positioned end to end defining a gap therebetween. The water management system includes a seal and a tube. The seal is disposed between the panels to prevent liquid from passing through the gap into the passenger compartment. The seal has a trough for collecting fluid entering the gap. The tube is in fluid communication with the trough, through which the fluid collected in the trough is directed away from the gap.

According to another aspect of the invention, a water management system is provided for a folding hardtop of a vehicle, wherein the hardtop has at least one panel movable to an extended position covering the passenger compartment. The water management system includes a first seal and a second seal disposed along opposite ends of the at least one panel. Each seal has a trough for collecting fluid passing over respective ends of the panel. A tube is in fluid communication with the troughs of both the first and second seals, through which the fluid collected in the troughs is directed away from the ends of the at least one panel.

According to another aspect of the invention, a water management system is provided for a folding hardtop of a vehicle, wherein the hardtop has at least one panel movable to an extended position covering the passenger compartment. The water management system includes a first seal and a second seal disposed along opposite ends of the at least one panel. Each seal has a trough for collecting fluid passing over respective ends of the panel. A first tube is in communication with the trough of the first seal. A second tube is in communication with the trough of the second seal. A third tube is coupled to both the first and second tubes for receiving fluid from therefrom and directing the fluid to an external location of the vehicle.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

Figure 1:
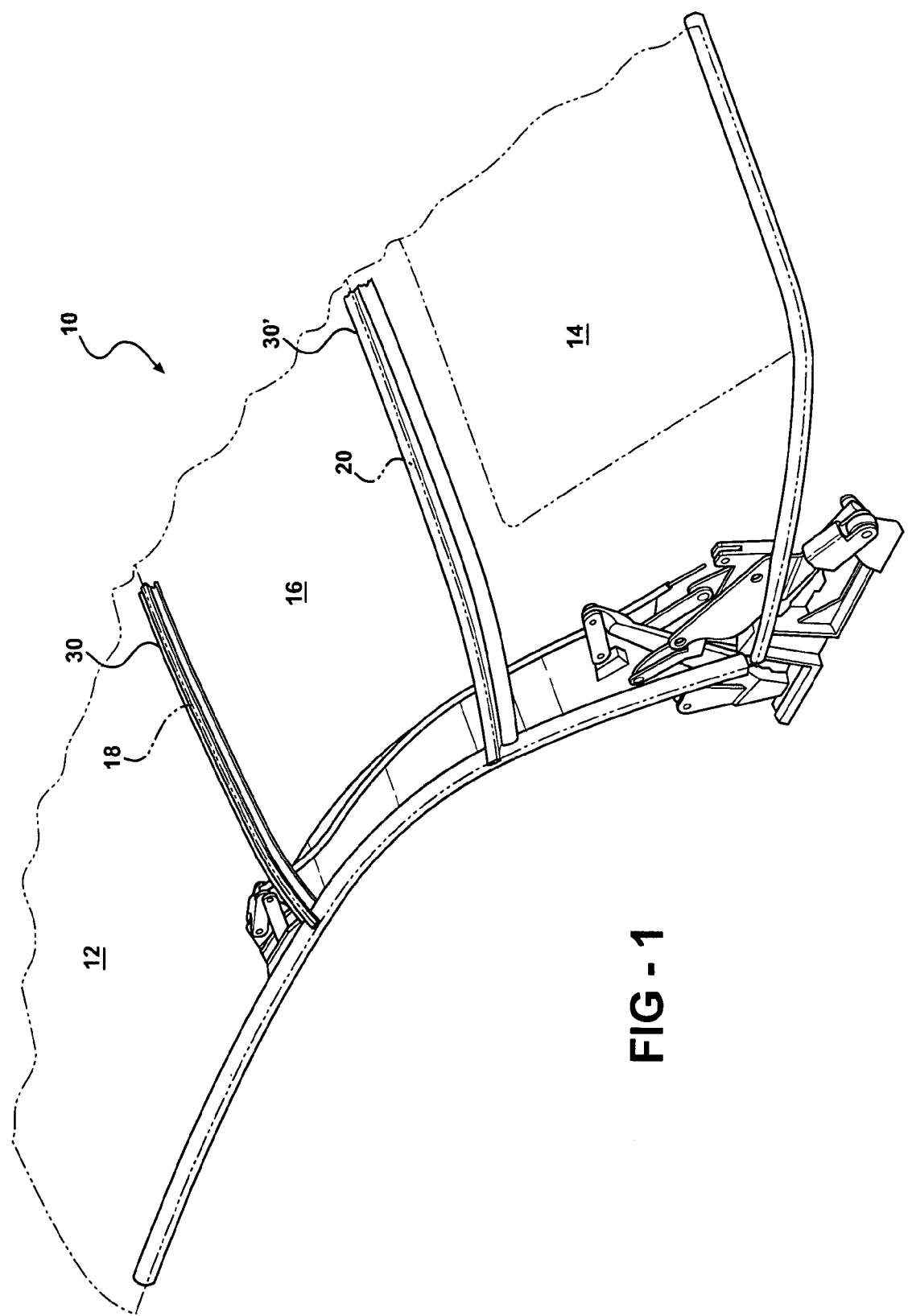
FIG. 1 is a rear perspective view of a retractable top having a water management system according to one embodiment of the invention.
Figure 2:
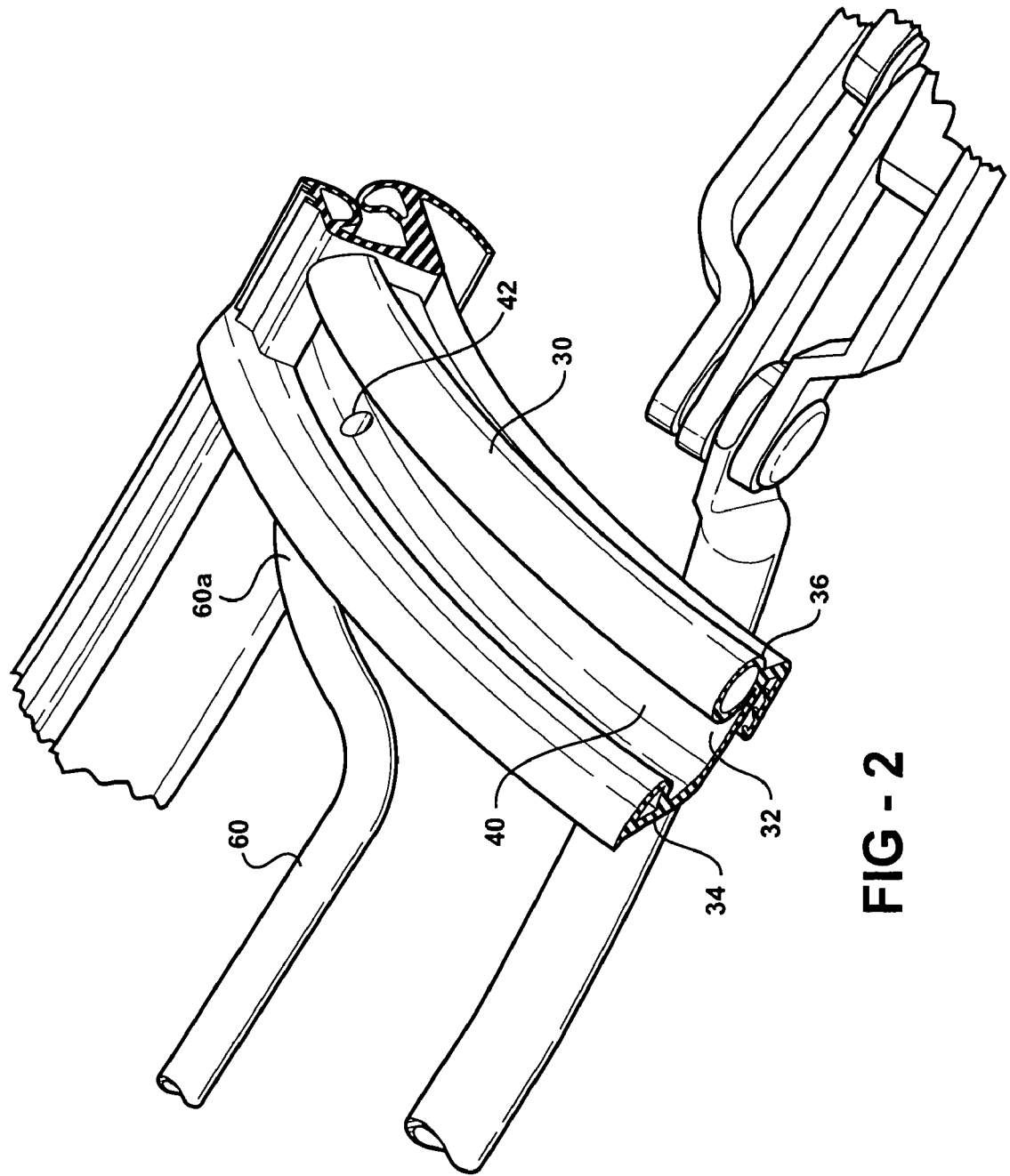
FIG. 2 is an enlarged front perspective view of a portion of a water management system according to one embodiment of the present invention.
Figure 3:
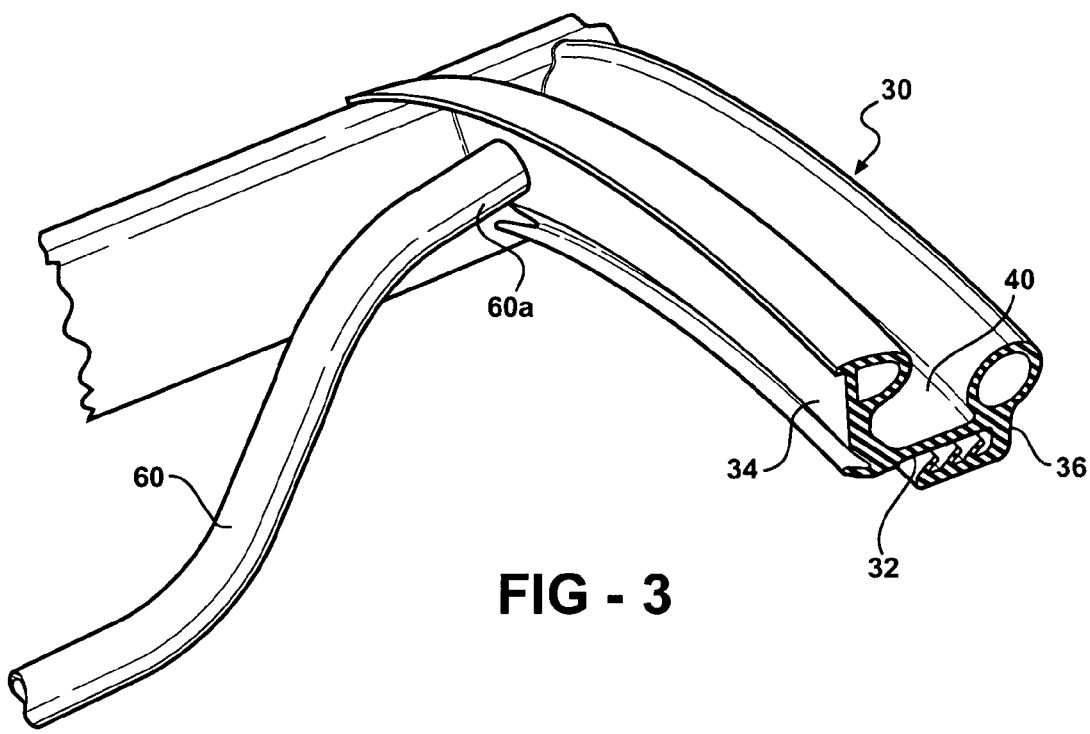
FIG. 3 is an enlarged rear perspective view of the portion of the water management system of FIG. 2 with a first tube coupled to a first seal.
Figure 4:
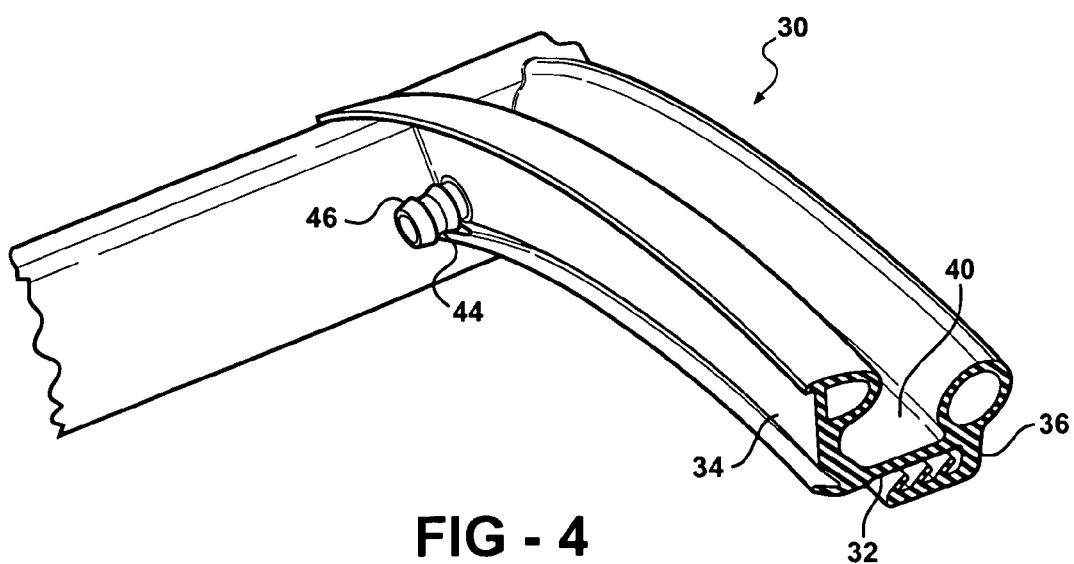
FIG. 4 is an enlarged rear perspective view of the water management system of FIG. 3 without the first tube.

The present invention provides a water management system for a retractable top of an automotive vehicle. The top also includes a mechanism for articulating the top between an extended position (as shown in FIG. 1) covering a passenger compartment of the vehicle and a retracted or stowed position (not shown) disposed in a recess adjacent the passenger compartment. Typically, the top includes at least two panels. As illustrated in FIG. 1, the top 10 includes a front panel 12, a rear panel 14, and a middle panel 16 extending therebetween. A front seam or gap 18 is defined between the front 12 and middle 16 panels. Similarly, a rear gap 20 is defined between the middle 16 and rear 14 panels. Described in greater detail below, the inventive water management system collects and directs liquid away from the front 18 and rear 20 gaps defined between the panels 12, 14, 16 of the top 10. Although one side of the top 10 and water management system is described below, it should be readily appreciated by those skilled in the art that the top 10 and the water management system are preferably symmetrically opposite about a fore and aft centerline of the vehicle.

Referring to FIGS. 1-8, the water management system includes a first seal 30 that extends longitudinally along the front gap 18. The first seal 30 defines a bottom wall 32 and two spaced apart side walls 34, 36. The bottom wall 32 extends transversely between the side walls 34, 36. The side walls 34, 36 extend orthogonally from the bottom wall 32 to define a longitudinally extending and generally U-shaped trough 40. Free ends of the side walls 34, 36 are preferably generally bulb shaped.

An aperture 42 is formed in one of the side walls 34. A nozzle 44 (FIG. 4) is integrally formed with the side wall 34 during mold formation of the first seal 30, such that the nozzle 44 is axially aligned with the aperture 42. The nozzle 44 extends axially outwardly from the side wall 34. The nozzle 44 has a plurality of radially extending barbs 46. The nozzle 44 is substantially rigid and formed from a plastic material, such as polypropylene.

A second seal 30' extends longitudinally along the rear gap 20. The second seal 30' (FIGS. 7 and 8) has substantially the same construction as the first seal 30, except that the aperture 42' is formed in the bottom wall 32' and the nozzle 44' extends outwardly from the bottom wall 32'. In one embodiment, the seals 30, 30' are mold formed from a rubber material, such as EPDM (Ethylene Propylene Diene Monomer) rubber.

Figure 5:
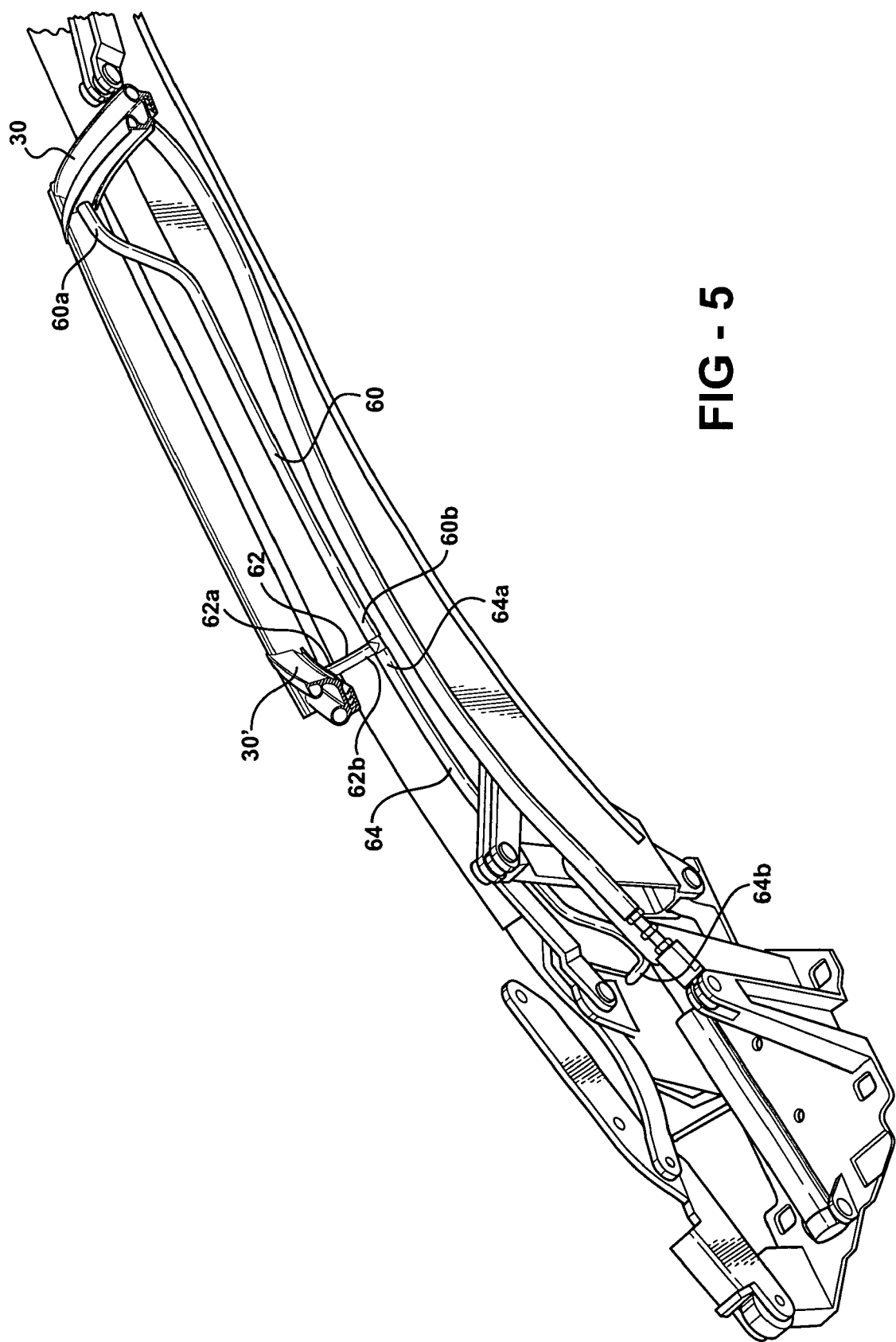
FIG. 5 is an enlarged rear perspective view of the retractable top incorporating a water management system according to the first embodiment of the present invention.
Figure 6:
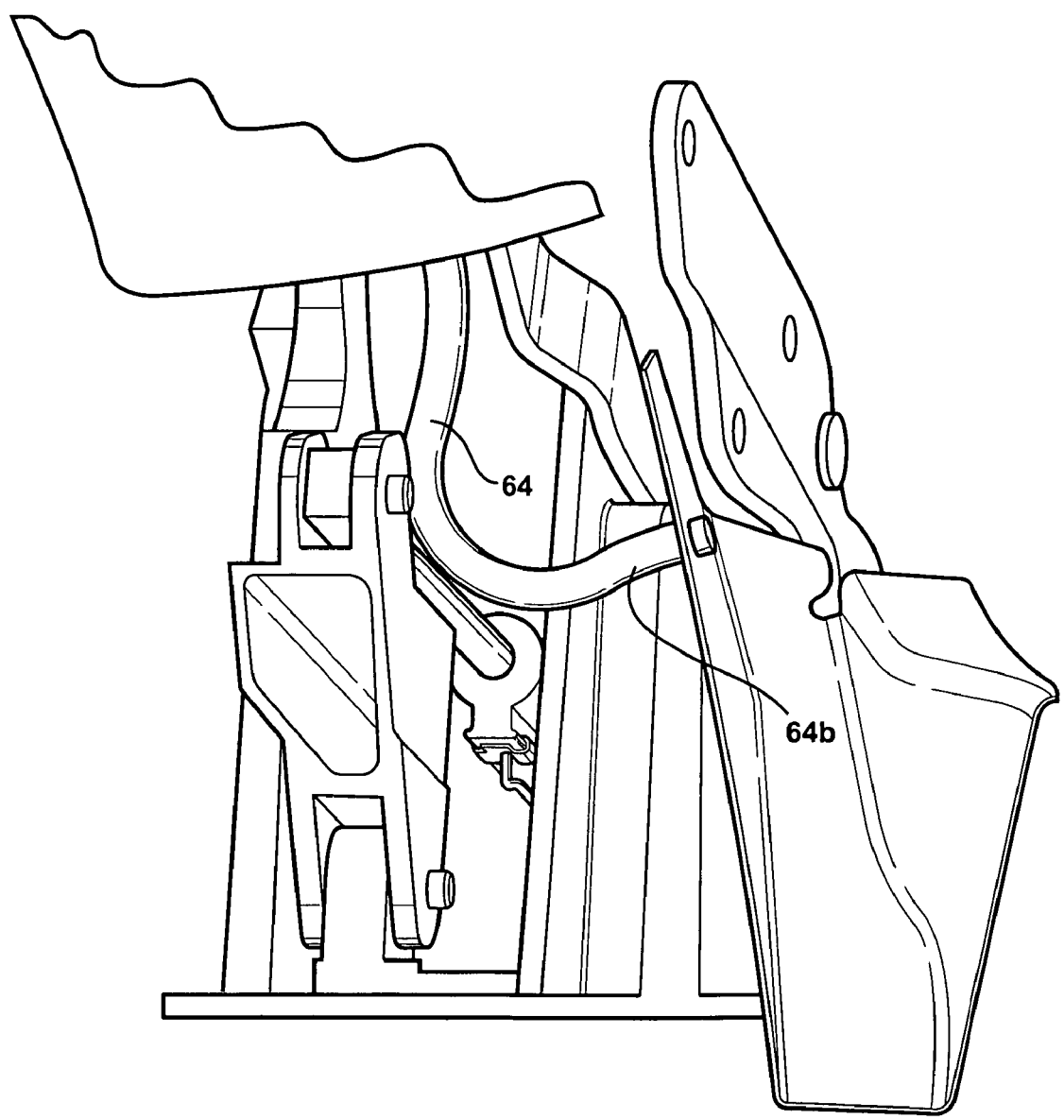
FIG. 6 is an enlarged front perspective view of the water management system of FIG. 5 with a third tube routed to an exterior area of the vehicle.
Figure 7:
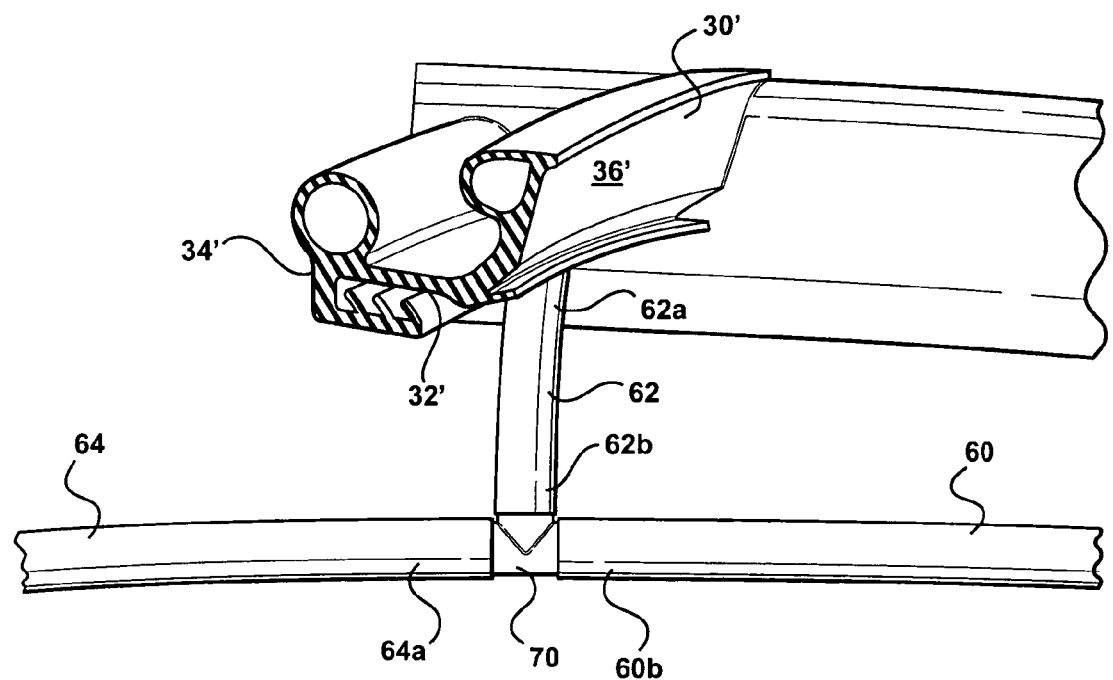
FIG. 7 is an enlarged perspective view of the water management system of FIG. 5 with a second seal coupled to first, second and third tubes by a connector.
Figure 8:
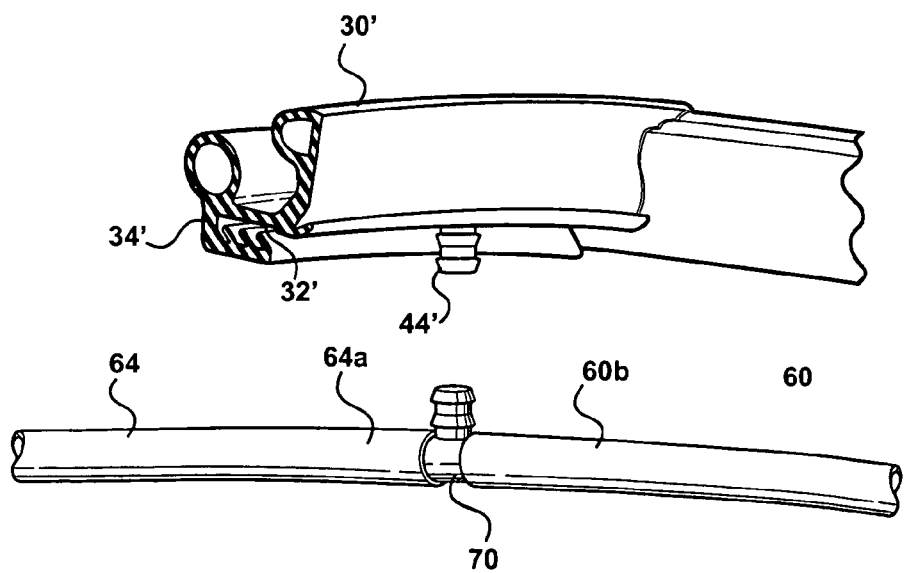
FIG. 8 is an enlarged perspective view of the water management system of FIG. 7 without the second tube.

Referring to FIG. 5, a first tube 60 extends between a proximal end 60a and a distal end 60b. The proximal end 60a of the first tube 60 is coupled to the nozzle 44 of the first seal 30. A second tube 62 extends between a proximal end 62a and a distal end 62b. The proximal end 62a of the second tube 62 is coupled to the nozzle 44' of the second seal 30'. A third tube 64 extends between a proximal end 64a and a distal end 64b. A Y- or T-shaped tube connector 70 includes three prongs for connecting the proximal end 64a of the third tube 64 to the distal ends 60b, 62b of the first 60 and second 62 tubes. The distal end 64b of the third tube 64 is directed toward an exterior region of the vehicle. Exterior region means anywhere outside of the passenger compartment. By this arrangement, the troughs 40, 40' are in continuous fluid communication with the tubes 60, 62, 64 and the exterior region of the vehicle.

In one embodiment, the first 30 and second 30' seals are fixedly secured to opposite ends of the middle panel 16 panel for movement therewith. By this arrangement, the first tube 60 can have a substantially fixed length. In other embodiments, one or both of the seals 30, 30' may be coupled to the front 12 and rear 14 panels, thereby requiring a tube 60 that is flexible in length to accommodate the relative displacement of the panels 12, 14, 16 during movement of the top 10 between the extended and retracted positions.

It should be readily appreciated by those having ordinary skill in the art that the ends 60b, 62b, 64a of the first 60, second 62 and third 64 tubes may be integrally formed together instead of using the tube connector 70 as described above. Similarly, the tubes 60, 62, 64 may be integrally formed to the seals 30, 30' rather than coupled to the nozzles 44, 44' as previously described.

In use the first seal 30 is fixedly secured to one of the front 12 and middle 16 panels. Similarly, the second seal 30 is fixedly secured to one of the middle 16 and rear 14 panels. The seals 30, 30' and tubes 60, 62, 64 are flexible to accommodate movement of the top 10 between the extended and retracted positions. In the extended position, the free ends of the first seal 30 are pressed together between front 12 and middle 16 panels 16 and the free ends of the second seal 30' are pressed together between the middle 16 and rear 14 panels to prevent liquid from passing between the panels 12, 14, 16 and into troughs 40, 40'. Liquid passing, however, between the free ends is collected in the troughs 40, 40'. The liquid is directed toward the apertures 42, 42' and into the first 60 and second 62 tubes. Liquid from the first 60 and second 62 tubes, in turn, is directed via the connector 70 into the third tube 64. The liquid is then expelled through the distal end 64b of the tube to the exterior region of the vehicle.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

We claim:

1. A water management system for a folding hardtop of a vehicle, wherein the hardtop having front, middle and rear panels movable between an extended position covering a passenger compartment and a stowed position disposed behind the passenger compartment, and wherein the panels are positioned end to end defining gaps therebetween, said water management system comprising:
   a front seal disposed along the gap between the front and middle panels, the front seal having a trough for collecting fluid entering the gap between the front and middle panels;
   a rear seal disposed along the gap between the middle and rear panels, the rear seal having a trough for collecting fluid entering the gap between the middle and rear panels; and
   a tube in fluid communication with the troughs of both the front and rear seals, through which the fluid collected in the troughs is directed to an external location of the vehicle.

2. A water management system as set forth in claim 1, wherein the tube provides continuous fluid communication between the troughs and the exterior region of the vehicle as the top moves between the extended and stowed positions.

3. A water management system as set forth in claim 1, further comprising side seals disposed along side edges of the panels, the tube being inboard of the side seals.

4. A water management system as set forth in claim 1, wherein the troughs each have a generally U-shaped cross section defined by a bottom wall extending between spaced apart side walls.

5. A water management system as set forth in claim 4, wherein distal ends of the side wails are bulb shaped.

6. A water management system as set forth in claim 4, wherein an aperture is defined in one of the side walls or in the bottom wall of each trough, the tube being aligned with the aperture such that fluid can pass through the aperture and the tube.

7. A water management system as set forth in claim 6, further including a nozzle extending outwardly from the one of the side walls or the bottom wall, the nozzle being aligned with the aperture and coupled to the tube to allow fluid to pass therethrough.

8. A water management system as set forth in claim 7, wherein the nozzle is integrally molded with the trough.

9. A water management system as set forth in claim 1, wherein the tube comprises a first portion in fluid communication with the trough of the front seal, a second portion in fluid communication with the trough of the rear seal, and a third portion in fluid communication with the first and second portions.

10. A water management system for a folding hardtop of a vehicle, wherein the hardtop has at least one panel movable to an extended position covering the passenger compartment, said water management system comprising:
    a first seal and a second seal disposed along opposite ends of the at least one panel, each seal having a trough for collecting fluid passing over respective ends of the panel; and
    a tube in fluid communication with the troughs of both the first and second seals and through which the fluid collected in the troughs is directed away from the ends of the at least one panel.

11. A water management system as set forth in claim 10, wherein the tube provides continuous fluid communication between the troughs and the exterior region of the vehicle as the top moves between the extended position and a retracted position.

12. A water management system as set forth in claim 10, further comprising side seals disposed along side edges of the panel, the tube being inboard of the side seals.

13. A water management system as set forth in claim 10, wherein the troughs each have a generally U-shaped cross section defined by a bottom wall extending between spaced apart side walls.

14. A water management system as set forth in claim 13, wherein distal ends of the side walls are bulb shaped.

15. A water management system as set forth in claim 13, wherein an aperture is defined in one of the side walls or in the bottom wall of each trough, the tube being aligned with the aperture such that fluid can pass through the aperture and the tube.

16. A water management system as set forth in claim 15, further including a nozzle extending outwardly from the one of the side walls or the bottom wall, the nozzle being aligned with the aperture and coupled to the tube to allow fluid to pass therethrough.

17. A water management system as set forth in claim 16, wherein the nozzle is integrally molded with the trough.

18. A water management system as set forth in claim 10, wherein the tube comprises a first portion in fluid communication with the trough of the first seal, a second portion in fluid communication with the trough of the second seal, and a third portion in fluid communication with the first and second portions.

19. A water management system for a folding hardtop of a vehicle, wherein the hardtop has at least one panel movable to an extended position covering the passenger compartment, said water management system comprising:
- a first seal and a second seal disposed along opposite ends of the at least one panel, each seal having a trough for collecting fluid passing over respective ends of the panel; and
- a first tube in communication with the trough of the first seal;
- a second tube in communication with the trough of the second seal; and
- a third tube coupled to both the first and second tubes for receiving fluid from therefrom and directing the fluid to an external location of the vehicle.

20. A water management system for a folding hardtop of a vehicle, wherein the hardtop has at least two panels movable to an extended position covering the passenger compartment, wherein the panels are positioned end to end defining a gap therebetween, said water management system comprising:
- a seal disposed between the panels to prevent liquid from passing through the gap into the passenger compartment, the seal having a trough for collecting fluid entering the gap; and
- a tube in fluid communication with the trough, through which the fluid collected in the trough is directed away from the gap.

* * * * *

UNITED STATES PATENT AND TRADEMARK OFFICE
CERTIFICATE OF CORRECTION

PATENT NO. : 7,464,987 B2
APPLICATION NO. : 11/304246
DATED : December 16, 2008
INVENTOR(S) : Wolfgang Richter et al.

It is certified that error appears in the above-identified patent and that said Letters Patent is hereby corrected as shown below:

Column 1, line 66, delete "from"

Column 3, line 28, after "16" delete "panel"

Column 6, line 14, delete "from"

Signed and Sealed this

Twenty-fourth Day of March, 2009

JOHN DOLL
*Acting Director of the United States Patent and Trademark Office*